US012812489B2

(12) United States Patent
Xu et al.

(10) Patent No.: US 12,812,489 B2
(45) Date of Patent: Nov. 24, 2026

(54) METHODS AND APPARATUS FOR DETERMINING NETWORK COVERAGE INTERRUPTION PREDICTION

(71) Applicant: Lenovo (Beijing) Limited, Beijing (CN)

(72) Inventors: Min Xu, Beijing (CN); Lianhai Wu, Beijing (CN); Ran Yue, Beijing (CN); Jing Han, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 324 days.

(21) Appl. No.: 18/723,852

(22) PCT Filed: Dec. 31, 2021

(86) PCT No.: PCT/CN2021/143671

§ 371 (c)(1),
(2) Date: Jun. 24, 2024

(87) PCT Pub. No.: WO2023/123351

PCT Pub. Date: Jul. 6, 2023

(65) Prior Publication Data

US 2025/0081063 A1 Mar. 6, 2025

(51) Int. Cl.
*H04W 36/14* (2009.01)
*H04B 7/185* (2006.01)
*H04W 84/06* (2009.01)

(52) U.S. Cl.
CPC ...... *H04W 36/142* (2023.05); *H04B 7/18513* (2013.01); *H04W 84/06* (2013.01)

(58) Field of Classification Search
CPC ........................... H04W 36/142; H04W 84/06; H04B 7/18513; H04B 7/18517; H04B 7/18515; G01S 5/0236; G01S 19/38
(Continued)

(56) References Cited

U.S. PATENT DOCUMENTS

2014/0293971 A1* 10/2014 Yoo ...................... H04W 72/54 370/336
2020/0178135 A1 6/2020 Yun et al.
(Continued)

FOREIGN PATENT DOCUMENTS

CN 113746523 A 12/2021
EP 3799331 A1 3/2021

OTHER PUBLICATIONS

"Extended European Search Report", EP Application No. 21969702. 6, Aug. 12, 2025, 17 pages.
(Continued)

*Primary Examiner* — Marcos Batista
(74) *Attorney, Agent, or Firm* — FIG. 1 Patents

(57) ABSTRACT

The present application relates to methods and apparatus for determining network coverage interruption prediction. One embodiment of the present disclosure provides a user equipment (UE), comprising: a transceiver; and a processor coupled to the transceiver, wherein the processor is configured to receive, via the transceiver, at least one of the following: assistance information of one or more variable cells: or first network coverage interruption prediction associated with the one or more variable cells, wherein the one or more variable cells at least include a serving cell of the UE; and determine second network coverage interruption prediction associated with the one or more variable cells based on at least one of the assistance information or the first network coverage interruption prediction.

20 Claims, 4 Drawing Sheets

(58) Field of Classification Search
USPC .......................................... 455/428; 370/338
See application file for complete search history.

(56) References Cited

U.S. PATENT DOCUMENTS

| | | | | |
|---|---|---|---|---|
| 2022/0110012 | A1* | 4/2022 | Ostrometzky ........ | H04W 24/02 |
| 2023/0300654 | A1* | 9/2023 | Da Silva ........... | H04W 36/0085 |
| | | | | 370/242 |

OTHER PUBLICATIONS

CMCC, "Discussion on support on Non continuous coverage", 3GPP TSG-RAN WG2 Meeting #116-e R2-2110262, Nov. 1, 2021, 5 pages.
Huawei, et al., "Discussion on mobility enhancement for IoT NTN", 3GPP TSG RAN WG2 #114-e R2-2105663, May 2021, 6 pages.
ZTE Corporation, et al., "Support of discontinuous coverage in IoT NTN", 3GPP TSG-RAN WG2 Meeting #115 electronic R2-2107765, Aug. 9, 2021, 4 pages.
3rd Generation Partnership Proje , "Assistance information for NTN discontinuous coverage", 3GPP TSG-RAN WG2 Meeting #116 electronic, R2-2110313, [retrieved from the internet on Sep. 20, 2024], <https://www.3gpp.org/ftp/tsg_ran/WG2_RL2/TSGR2_116-e/Docs>, Nov. 1, 2021, 3 pages.
3rd Generation Partnership Proje , "Discussion on non continuous coverage", 3GPP TSG-RAN2 Meeting #116-e, R2-2110977, [retrieved from the internet on Sep. 20, 2024], <https://www.3gpp.org/ftp/tsg_ran/WG2_RL2/TSGR2_116-e/Docs>, Nov. 1, 2021, 4 pages.
3rd Generation Partnership Proje , "Summary of 9.2.2 Non continuous coverage", 3GPP TSG-RAN WG2 Meeting #116bis-e, R2-2111479, [retrieved from the internet on Sep. 20, 2024], <https://www.3gpp.org/ftp/tsg_ran/WG2_RL2/TSGR2_73/Docs>, Jan. 17, 2021, 5 pages.
PCT/CN2021/143671 , "International Search Report and Written Opinion", International Application No. PCT/CN2021/143671, Sep. 15, 2022, 8 pages.

* cited by examiner

METHODS AND APPARATUS FOR DETERMINING NETWORK COVERAGE INTERRUPTION PREDICTION

TECHNICAL FIELD

The present disclosure relates to non-terrestrial networks (NTN), and more specifically relates to methods and apparatus for determining network coverage interruption prediction.

BACKGROUND OF THE INVENTION

For NTN, the discontinuous coverage may happen in space and/or time domain due to sparse constellation of satellites and satellite movement. It may lead to additional and unnecessary power consumption which is at least essential to internet of things (IoT) devices. The scenario has been considered typical for IoT NTN.

Unlike the temporary coverage interruptions in terrestrial networks (TN), in NTN the coverage interruptions are expected to last for a longer time duration (hours) and are predictable with the help of satellite assistance information. With coverage interruption predicted, UE may avoid unnecessary cell selection/reselection, radio resource control (RRC) reestablishment, or even enter power saving mode when network coverage interrupts and may resume when network coverage restores.

Accordingly, it is desirable to provide a solution for determining network coverage interruption prediction.

SUMMARY

One embodiment of the present disclosure provides a user equipment (UE), comprising: a transceiver; and a processor coupled to the transceiver, wherein the processor is configured to receive, via the transceiver, at least one of the following: assistance information of one or more variable cells; or first network coverage interruption prediction associated with the one or more variable cells, wherein the one or more variable cells at least include a serving cell of the UE; and determine second network coverage interruption prediction associated with the one or more variable cells based on at least one of the assistance information or the first network coverage interruption prediction.

In some embodiments, the transceiver is further configured to transmit a request including at least one of: a first indicator requesting the assistance information of one or more variable cells; or a second indicator requesting the first network coverage interruption prediction associated with the one or more variable cells.

In some embodiments, the transceiver is triggered to transmit the request by an event, a timer, or periodically.

In some embodiments, the first indicator includes at least one of the following: an indication indicating a request for full assistance information; an indication indicating a part of the assistance information; one or more cell identities associated with the assistance information; or one or more access node identities associated with the assistance information.

In some embodiments, the second indicator includes at least one of the following: location information of the UE; movement information of the UE; an indication requesting for the first network coverage interruption; one or more cell identities associated with the first network coverage interruption; or one or more moving access node identities associated with the first network coverage interruption.

In some embodiments, the request is transmitted in a dedicated signaling, a dedicated RRC signaling, a MAC CE, or a container message.

In some embodiments, the assistance information includes at least one of the following: cell-specific assistance information; UE-specific assistance information; or an additional indication requesting report of the second network coverage interruption prediction.

The UE of claim 1, wherein the assistance information is received in a dedicated signaling, a dedicated RRC signaling, a MAC CE, or a container message.

In some embodiments, the first network coverage interruption prediction includes at least one of: network coverage interruption prediction associated with one or more cells; network coverage interruption prediction associated with the UE; or an indication for reporting the second network coverage interruption prediction.

In some embodiments, the second network coverage interruption prediction includes at least one of the following: a start time of network coverage interruption; a serving cell identity at the start time; a serving access node identity at the start time; an end time of network coverage interruption; an upcoming cell identity at the end time; or an upcoming access node identity at the end time.

In some embodiments, determining the second network coverage interruption prediction includes: determining a start time of network coverage interruption based on at least one of: a cell-specific stop serving time of the serving access node; a UE-specific stop serving time of a possible serving access node; an ephemeris of a cell-specific serving access node and a cell edge of a cell managed by the cell-specific serving access node; or an ephemeris of a UE-specific possible serving access node and a UE-specific cell edge a cell managed by the UE-specific possible serving access node; and/or determining an end time of network coverage interruption based on at least one of: a cell-specific start serving time of an upcoming access node; a UE-specific start serving time of the upcoming access node; an ephemeris of a cell-specific serving access node and a cell edge of a cell managed by the cell-specific serving access node; or an ephemeris of a UE-specific possible serving access node and a UE-specific cell edge of a cell managed by the UE-specific possible serving access node.

In some embodiments, the transceiver is further configured to: report the second network coverage interruption prediction to the serving access node.

In some embodiments, the second prediction is transmitted in a dedicated signalling message, a MAC CE, or a container message.

In some embodiments, the transceiver is further configured to: report the second network coverage interruption prediction to the serving access node in at least one of the following cases: upon receiving an indication for reporting the second network coverage interruption prediction; upon expiration of a validity timer; or in a periodically way.

Another embodiment of the present disclosure provides an access node, comprising: a transceiver; and a processor coupled to the transceiver, and the processor is configured to: determine at least one of the following: assistance information of one or more variable cells; or first network coverage interruption prediction associated with the one or more variable cells, wherein the one or more variable cells at least include a serving cell of a UE; and transmit, via the transceiver, at least one of the assistance information and the first network coverage interruption prediction to the UE.

In some embodiments, the transceiver is further configured to receive a request, wherein the request includes at least one of: a first indicator requesting the assistance information of one or more variable cells; or a second indicator requesting the first network coverage interruption prediction associated with the one or more variable cells.

In some embodiments, the processor is further configured to: determine first network coverage interruption prediction at least based on the assistance information of the one or more variable cells and the second indicator.

In some embodiments, the first indicator includes at least one of the following: an indication indicating a request for full assistance information; an indication indicating a part of the assistance information; one or more cell identities associated with the assistance information; or one or more access node identities associated with the assistance information.

In some embodiments, the second indicator includes at least one of the following: location information of the UE; movement information of the UE; an indication requesting for the first network coverage interruption; one or more cell identities associated with the first network coverage interruption; or one or more moving access node identities associated with the first network coverage interruption.

In some embodiments, the request is received in a dedicated signaling, a dedicated RRC signaling, a MAC CE, or a container message.

In some embodiments, the assistance information includes at least one of the following: cell-specific assistance information; UE-specific assistance information; or an additional indication requesting report of the second network coverage interruption prediction to the UE or to all UEs.

In some embodiments, the assistance information is transmitted in a dedicated signaling, a dedicated RRC signaling, a MAC CE, or a container message.

In some embodiments, the first network coverage interruption prediction includes at least one of: network coverage interruption prediction associated with one or more cells; network coverage interruption prediction associated with the UE; or an indication for reporting the second network coverage interruption prediction.

In some embodiments, the transceiver is further configured to: receive the second network coverage interruption prediction.

In some embodiments, the second network coverage interruption prediction includes at least one of the following: a start time of network coverage interruption; a serving cell identity at the start time; a serving access node identity at the start time; an end time of network coverage interruption; an upcoming cell identity at the end time; or an upcoming access node identity at the end time.

In some embodiments, the second prediction is received in a dedicated signalling message, a MAC CE, or a container message.

Yet another embodiment of the present disclosure provides a method performed by a UE, comprising: receiving at least one of the following: assistance information of one or more variable cells; or first network coverage interruption prediction associated with the one or more variable cells, wherein the one or more variable cells at least include a serving access node of the UE; and determining second network coverage interruption prediction associated with the one or more variable cells based on at least one of the assistance information or the first network coverage interruption prediction.

Still another embodiment of the present disclosure provides a method performed by an access node, comprising: determining at least one of the following: assistance information of one or more variable cells; or first network coverage interruption prediction associated with the one or more variable cells, wherein the one or more variable cells at least include a serving cell of a UE; and transmitting at least one of the assistance information and the first network coverage interruption prediction to the UE.

DETAILED DESCRIPTION

Figure 1A:
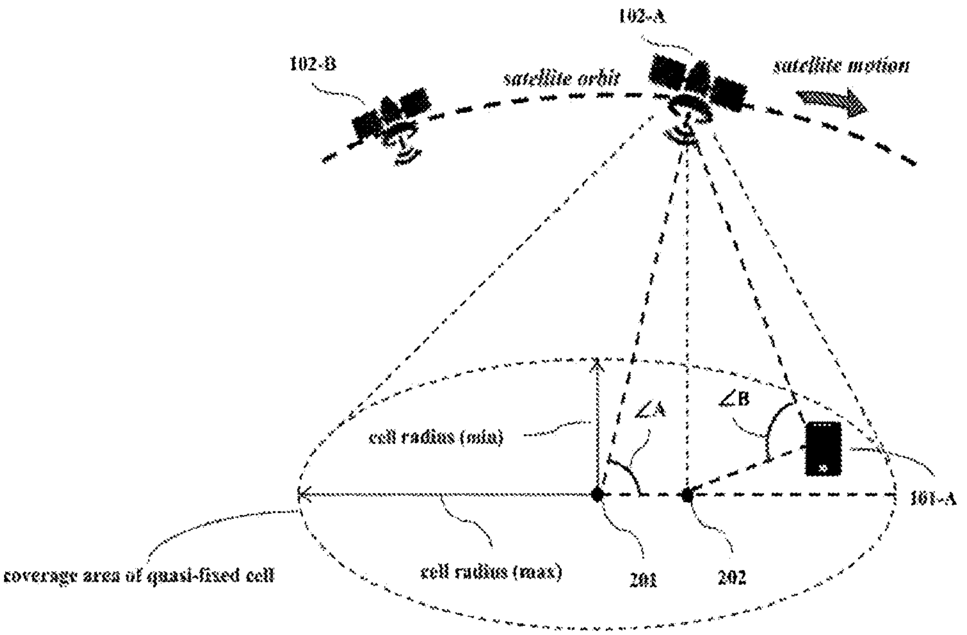
FIGS. 1A-1D illustrate some exemplary NTN according to some embodiments of the present disclosure.

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

While operations are depicted in the drawings in a particular order, persons skilled in the art will readily recognize that such operations need not be performed in the particular order shown or in sequential order, or that all illustrated operations be performed, to achieve desirable results, sometimes one or more operations can be skipped. Further, the drawings can schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing can be advantageous.

In 3GPP Rel-17 NTN using NR air interface is discussed in the work item "Solutions for NR to support NTN" and NTN using LTE air interface for IoT UEs is discussed in the work item "Study on NB-IoT/eMTC support for NTN".

During the discussions for "Study on NB-IoT/eMTC support for NTN" scenarios, satellite service providers proposed to include microsatellite platforms (also known as: cube satellites) with limited size and power and low-density satellite constellations, which have restricted link budget and discontinuous coverage where UE can remain long periods of time without being able to detect a satellite cell. The signalling support and enhancement for discontinuous coverage are discussed in 3GPP RAN2.

For NTN the discontinuous coverage may happen in space and/or time domain due to sparse constellation of satellites and satellite movement. It may lead to additional and unnecessary power consumption which is at least essential to IoT devices. The scenario has been considered typical for IoT NTN and some companies showed interests to study in NR NTN as well.

Unlike the temporary coverage interruptions in TN, in NTN the coverage interruptions are expected to last for a longer time duration (hours) and are predictable with the help of satellite assistance information. With coverage interruption predicted, UE may avoid unnecessary cell selection or reselection, radio resource control (RRC) reestablishment, or even enter Power Saving Mode when network coverage interrupts and may resume when network coverage restores.

Accordingly, it is necessary to predict the coverage discontinuity of the cell for the UE. In order to do so, the satellite assistance information may be used for predicting NTN discontinuous coverage. Satellite Ephemeris Parameters may also be needed for the UE for predicting coverage discontinuity. Furthermore, the start-time of (upcoming) satellite's coverage and end-time of serving satellite's coverage is needed for Quasi-Earth Fixed satellites.

FIGS. 1A-1D illustrate some exemplary NTNs according to some embodiments of the present disclosure.

Specifically, there are four access nodes, access node 102-A, access node 102-B, access node 102-C, and access node 102-D, which are satellites, and four UEs, UE 101-A, UE 101-B, UE 101-C, and UE 101-D as illustrated in FIGS. 1A-1D. Although only limited numbers of satellites and UEs are depicted, it is contemplated that any number of UEs and satellites may be included in the NTN.

Non-terrestrial network (NTN) refers to a network, or segment of networks using radio frequency (RF) resources on board a satellite. The satellites s in NTN may include low earth orbiting (LEO) satellites orbiting around the Earth, medium earth orbiting (MEO) satellites, geostationary earth orbiting (GEO) satellites with fixed location to the Earth, as well as highly elliptical orbiting (HEO) satellites.

The UE may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE includes wearable devices, such as smart watches, fitness bands, optical head-mounted displays, or the like. Moreover, the UE may be referred to as subscriber units, mobiles, mobile stations, users, terminals, mobile terminals, wireless terminals, fixed terminals, subscriber stations, user terminals, a device, or by other terminology used in the art. The UE may communicate directly with the satellite via service link.

The prediction of discontinuous coverage for a UE may include coverage area or duration of a satellite cell, coverage gaps between satellite cells (i.e. the area or the time duration of coverage interruption), and optimal time for transmission. To implement the prediction, the following information may be used as contents of the satellite assistant information.

1. Satellite ephemeris of the serving satellite, which may include the orbital parameters indicating satellite orbit and its relative position on the orbit, and/or the 3D coordinates indicating satellite position and its velocity. For NR NTN this information needs to be provisioned to UE in System Information (SI) for UE timing advance pre-compensation when initiating random access. For example, the satellite ephemeris of satellite 102-A in FIG. 1A. The satellite ephemeris may be represented with orbital parameters and satellite parameters, or represented with 3D positions and delta positions.
2. Satellite ephemeris of neighboring satellites, or upcoming satellites (similar format to that of the serving cell). For NR NTN this information may be provisioned to UE for mobility management in IDLE state or INACTIVE state. For example, the satellite ephemeris of satellite 102-B in FIG. 1A.
3. Start time of upcoming (i.e. next neighboring) satellite's coverage. For IoT NTN this information may be provisioned to UE for discontinuous coverage prediction in quasi-fixed scenario. For example, the start time of the coverage of satellite 102-B in FIG. 1A.
4. End time of last serving satellite's coverage. For NR NTN this information may be provisioned to UE for mobility management in CONNECTED state, IDLE state, or INACTIVE state during link switch due to satellite movement in quasi-fixed scenario. For example, the end time of the coverage of satellite 102-A in FIG. 1A.
5. Reference location (e.g. cell center) of the serving cell and/or neighboring cell. For NR NTN this information may be provisioned to UE for mobility management in IDLE state or INACTIVE state. For example, the cell center is marked by the reference numeral "201" in FIG. 1A.
6. Nadir point of the serving cell or neighboring cell, which is the nearest location on Earth to the serving/neighboring satellite that forms the serving cell or neighboring cell. For example, the nadir point is marked by the reference numeral "201" in FIG. 1A.
7. Radius of the serving cell and/or neighboring cell, which may vary between the maximum value and the minimum value if the shape of cell is an ellipse. For in FIG. 1A, the max cell radius and the min cell radius are marked as "cell radius (max)" and "cell radius (min)" respectively.
8. Elevation angle from the serving satellite to the UE. For example, "∠B" as shown in FIG. 1A. In NTN the satellite forms a cell with directional antenna and can derive its elevation angle to the UE, e.g. by the direction of satellite beam that serves the UE. For example, when the elevation angle from the serving satellite to the UE is smaller than the minimum threshold associated to UE or satellite capability, the satellite will not be able to serve the UE. The minimum threshold may be referred to as "∠B (min)."
9. Elevation angle from the serving satellite to cell center. For example, "∠ A" as shown in FIG. 1A. When the elevation angle from the serving satellite to the cell center is smaller than the minimum threshold associated to satellite capability, the satellite will not be able to serve the area. The minimum threshold may be referred to as "∠A (min)."

FIG. 1A illustrates a Quasi-fixed NTN cell scenario, and a low-mobility UE 101-A is within the Quasi-fixed cell.

In FIGS. 1A, there are two access nodes, satellite 102-A and satellite 102-B, which may be two satellites, one UE, UE 101-A. UE 101-A is a low mobility UE, which is assumed to be in a limited area (e.g. within the serving cell coverage area) before and after the coverage interruption.

FIG. 1A illustrates a quasi-fixed NTN cell scenario, that is, the coverage area of the cell A does not move as the satellite moves. When satellite 102-A cannot provide the service for the coverage area of the cell 1A, satellite 102-B provides the service for the coverage area of the cell 1A. That is, satellite 102-A may be referred to as the last serving satellite, and satellite 102-B, which is the next neighboring satellite, may be referred to as the upcoming satellite, the incoming satellite, or the like.

In FIG. 1A, UE 101-A needs at least one set of the following information to predict the start time of coverage interruption:

1. Satellite ephemeris of the last serving satellite and the end time of last serving satellite's coverage, which can be directly used by UE as the start time of coverage interruption. That is, the end time of the coverage of satellite 102-A.
2. Satellite ephemeris of the last serving satellite, the minimum elevation angle from the last serving satellite to cell center, and cell center of the last serving cell. UE derives satellite location by ephemeris, and the start time of coverage interruption could be calculated as the time when the elevation angle from the last serving satellite to cell center becomes smaller than the minimum elevation angle. That is, the satellite ephemeris of B satellite S 102-A, the minimum value of "∠A," and cell center 201 in FIG. 1A.
3. Network's prediction of the start time of coverage interruption. Network may be able to predict the start time of coverage interruption of the entire cell with the last serving satellite ephemeris, or predict UE-specific start time of coverage interruption with UE's location information.

UE 101-A needs at least one set of the following information to predict the end time of coverage interruption:

1. Satellite ephemeris of the upcoming satellite and the start time of the upcoming satellite's coverage, which can be directly used by UE as the end time of coverage interruption. That is, the start time of the coverage of satellite 102-B.
2. Satellite ephemeris of the upcoming satellite, the minimum elevation angle from the upcoming satellite to cell center, and cell center of the upcoming cell. UE derives satellite location by ephemeris, and the end time of coverage interruption could be calculated as the time when the elevation angle from the upcoming satellite to cell center becomes larger than the minimum elevation angle. That is, the satellite ephemeris of satellite 102-B, the minimum elevation angle from satellite 102-B to cell center 201, and cell center 201 in FIG. 1A (since FIG. 1 illustrates a quasi-fixed NTN cell scenario, the cell center does not change).
3. Network's prediction of the end time of coverage interruption. Network may be able to predict the end time of coverage interruption of the entire cell with the upcoming satellite ephemeris, or predict UE-specific end time of coverage interruption with UE's location information.

If the prediction is to be made at UE side, the network needs to provide necessary satellite assistance information (ephemeris only is not sufficient) to the UE. In FIG. 1A, all the sets of satellite assistance information mentioned above are cell-specific, and therefore it is possible to include them in SI broadcast. The following options are possible.

A1. All satellite assistance information is broadcasted in SI, which includes:
  a) satellite ephemeris of the last serving satellite, i.e. satellite ephemeris of satellite 102-A;
  b) satellite ephemeris of the upcoming satellite, i.e. satellite ephemeris of satellite 102-B;
  c) end time of last serving satellite's coverage, i.e. end time of the coverage of satellite 102-A;
  d) start time of the upcoming satellite's coverage, i.e. start time of the coverage of satellite 102-B;
  e) cell center of the last serving cell, cell center marked by reference 201 in FIG. 1A;
  f) cell center of the upcoming cell,
  g) the minimum elevation angle from the last serving satellite to cell center, for example, the minimum elevation angle "ZA" in FIG. 1A.
  h) the minimum elevation angle the upcoming satellite to cell center;
  i) the minimum elevation angle from the last serving satellite to UE, for example, the minimum elevation angle "/B" in FIG. 1A.
  j) the minimum elevation angle from the upcoming satellite to UE.

Option A1 applies both in LTE and NR systems.

A2. Part of satellite assistance information is broadcast in the minimum SI, which includes the above parameter a) and b), i.e. satellite ephemeris of the last serving satellite and satellite ephemeris of the upcoming satellite. The other information (which includes the above parameter c) to g)) is included in other SI that can be requested by UE on demand. Option A2 only applies in NR systems.

A3. Part of satellite assistance information is broadcast in the minimum SI, which includes the above parameter a) and b), i.e. satellite ephemeris of the last serving satellite and satellite ephemeris of the upcoming satellite. The other information (which includes the above parameter c) to g)) is included in configuration that can be requested by UE with RRC signalling. Option A3 applies both in LTE and NR systems.

If the prediction is to be made at network side, the following options may be possible.

A4. Network's prediction of the start time of coverage interruption for the entire serving cell and the end time of coverage interruption for the entire upcoming cell is broadcast in SI. Option A4 applies both in LTE and NR systems.

A5. Network's prediction of the start time of coverage interruption for the entire serving cell and the end time of coverage interruption for the entire upcoming cell is in other SI that can be requested by UE on demand. Option A5 only applies in NR systems.

A6. Network's prediction of the start and end time of coverage interruption for a specific UE is included in configuration that can be requested by UE with RRC signalling. This applies both in LTE and NR systems. In Option A6, UE may need to report its location information to help network in prediction.

Figure 1B:
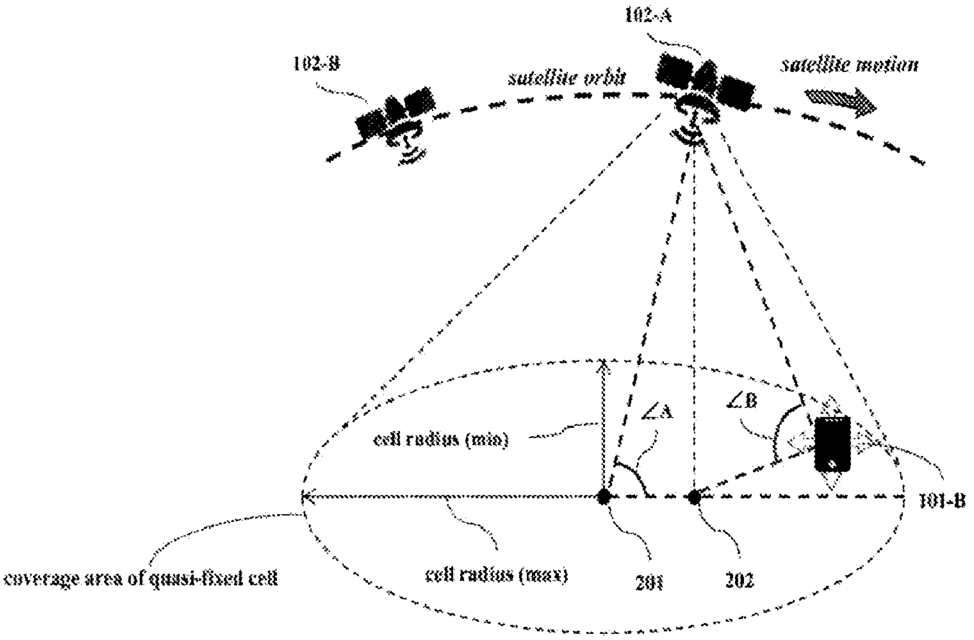

FIG. 1B illustrates a Quasi-fixed NTN cell scenario, and a high-mobility UE 101-B is within the Quasi-fixed cell.

In FIGS. 1B, there are two access nodes, access node 102-A and access node 102-B, which may be two satellites, one UE, UE 101-B. UE 101-B is a high mobility UE, which is assumed to be in any place in the cell before and after the coverage interruption.

UE 101-B needs at least one set of the following information to predict the start time of coverage interruption:

1. Satellite ephemeris of the last serving satellite, the end time of last serving satellite's coverage, and last serving cell's coverage area information (e.g. represented by cell center and radius, the minimum signal strength, or the minimum propagation delay). UE needs to predict whether it is in the last serving cell based on coverage area information and UE movement, and consider the end time of last serving satellite's coverage as the start time of coverage interruption. That is, UE 101-B predict the start time of coverage interruption based on the coverage area of quasi-fixed cell and UE movement.

2. Satellite ephemeris of the last serving satellite, the minimum elevation angle from the last serving satellite to cell center, cell center of the last serving cell, and additional last serving cell's coverage area information. UE needs to predict whether it is in the last serving cell based on coverage area information and UE movement, and derive satellite location by ephemeris. The start time of coverage interruption could be calculated as the time when the elevation angle from the upcoming satellite to cell center becomes smaller than the minimum elevation angle. That is, UE 101-B predict the start time of coverage interruption based on the value of "ZA".
3. Network's prediction of the start time of coverage interruption. Network may be able to predict the start time of coverage interruption of the entire cell with the last serving satellite ephemeris, or predict UE-specific start time of coverage interruption with UE's location and movement information.

UE 101-B needs at least one set of the following information to predict the end time of coverage interruption:

1. Satellite ephemeris of the upcoming satellite, the start time of the upcoming satellite's coverage, and the upcoming cell's coverage area information. UE needs to predict whether it will be in the upcoming cell based on coverage area information and UE movement, and consider the start time of the upcoming satellite's coverage as the end time of coverage interruption. That is, UE 101-B predict the end time of coverage interruption based on the coverage of the upcoming satellite 102-B.
2. Satellite ephemeris of the upcoming satellite, the minimum elevation angle from the upcoming satellite to cell center, and cell center of the upcoming cell. UE needs to predict whether it is in the upcoming cell based on coverage area information and UE movement, and derive satellite location by ephemeris. The end time of coverage interruption could be calculated as the time when the elevation angle from the upcoming satellite to cell center becomes larger than the minimum elevation angle.
3. Network's prediction of the end time of coverage interruption. Network may be able to predict the end time of coverage interruption of the entire cell with the upcoming satellite ephemeris, or predict UE-specific end time of coverage interruption with UE's location and movement information.

If the prediction is to be made at UE side, the network needs to provide necessary satellite assistance information (ephemeris only is not sufficient) to the UE. In this case, all the sets of satellite assistance information mentioned above are cell-specific, and therefore it is possible to include them in SI broadcast. The following options could be possible.

B1. All satellite assistance information is broadcast in SI. The satellite assistance information is identical to the satellite assistance information as in option A1. Option B1 applies both in LTE and NR systems.

B2. Part of satellite assistance information is broadcast in the minimum SI, which may include satellite ephemeris of the last serving satellite and satellite ephemeris of the upcoming satellite. The other information (which includes the above parameter c) to g) in option A1) is included in other SI that can be requested by UE on demand. Option B2 only applies in NR systems.

B3. Part of satellite assistance information is broadcast in the minimum SI, which may include satellite ephemeris of the last serving satellite and satellite ephemeris of the upcoming satellite. The other information (which includes the above parameter c) to g) in option A1) is included in configuration that can be requested by UE with RRC signalling. Option B3 applies both in LTE and NR systems.

If the prediction is to be made at network side, the following options could be possible.

B4. Network's prediction of the start time of coverage interruption for the entire serving cell and the end time of coverage interruption for the entire upcoming cell is broadcast in SI. Option B4 applies both in LTE and NR systems.

B5. Network's prediction of the start time of coverage interruption for the entire serving cell and the end time of coverage interruption for the entire upcoming cell is in other SI that can be requested by UE on demand. Option B5 only applies in NR systems.

B6. Network's prediction of the start and end time of coverage interruption for a specific UE is included in configuration that can be requested by UE with RRC signalling. This applies both in LTE and NR systems. In option B6, UE may need to report its location and movement information to help network in prediction.

Figure 1C:
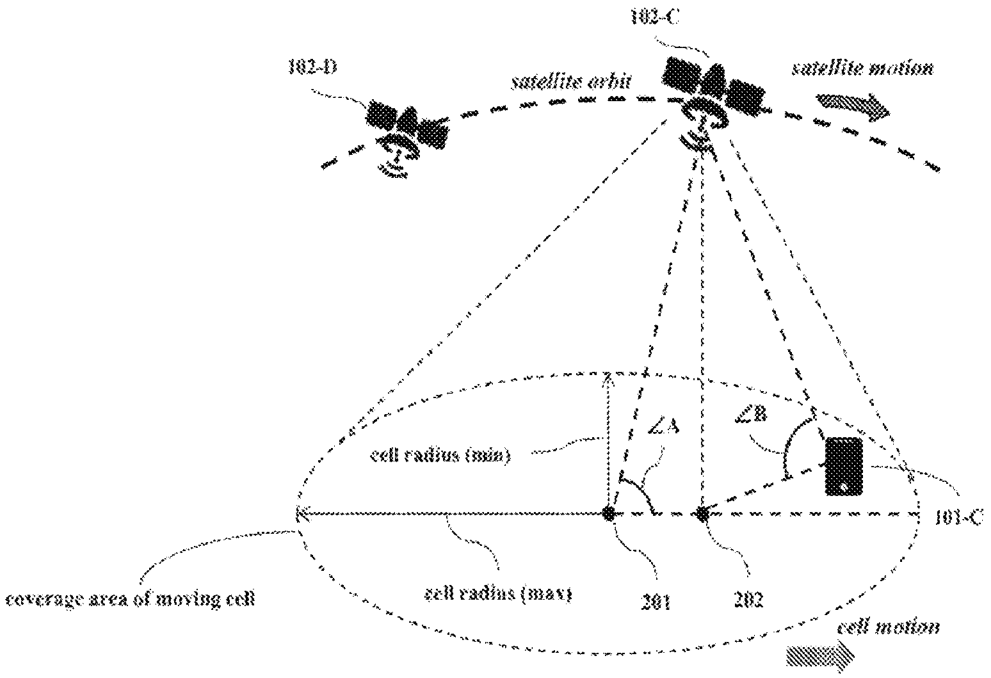

FIG. 1C illustrates a moving NTN cell scenario, and a low-mobility UE 101-C is within the moving NTN cell.

In FIGS. 1C, there are two access nodes, access node 102-C and access node 102-D, which may be two satellites, one UE, UE 101-C. UE 101-C is a low mobility UE, which is assumed to be in a limited area (e.g. within the serving cell coverage area) before and after the coverage interruption. Each of satellite 102-C and satellite 102-D manages a variable cell on Earth, and the cell moves along with the satellite. UE 101-C needs at least one set of the following information to predict the start time of coverage interruption:

1. Satellite ephemeris of the last serving satellite (i.e. satellite 102-C), and the elevation angle from the last serving satellite to UE (and possibly its changing rate), and the minimum elevation angle from the last serving satellite to UE. UE needs to predict whether it is in the last serving cell based on satellite ephemeris and elevation angle. The start time of coverage interruption could be calculated as the time when the elevation angle from the last serving satellite to UE becomes smaller than the minimum elevation angle. That is, UE 101-C predict the start time of coverage interruption based on the coverage area of quasi-fixed cell and UE movement.
2. Satellite ephemeris of the last serving satellite, and the last serving cell's coverage area information. UE needs to predict whether it is in the last serving cell based on satellite ephemeris and coverage area information. The start time of coverage interruption could be calculated as the time when UE leaves the coverage area.
3. Network's prediction of the start time of coverage interruption. Network may be able to predict UE-specific start time of coverage interruption with UE's location information.

UE also needs at least one set of the following information to predict the end time of coverage interruption:

1. Satellite ephemeris of the upcoming satellite (i.e. satellite 102-D), and the upcoming cell's coverage area information. UE needs to predict whether it will be in the upcoming cell based on satellite ephemeris and coverage area information. The end time of coverage interruption could be calculated as the time when UE enters the coverage area.
2. Network's prediction of the end time of coverage interruption. Network may be able to predict UE-specific end time of coverage interruption with UE's location information.

If the prediction is to be made at UE side, the network needs to provide necessary satellite assistance information (ephemeris only is not sufficient) to the UE. In FIG. 1C, some of satellite assistance information mentioned above are UE-specific (e.g. elevation angle from the last serving satellite to UE, coverage area information that may vary due to UE capability including cell center and radius for UE capable of positioning, different minimum signal strength or propagation delay for different UE power class), and therefore it is not possible to include all of them in SI broadcast. The following options could be possible.

C1) Part of satellite assistance information (e.g. cell-specific information like satellite ephemeris and the minimum elevation angle of the last serving satellite) is broadcast in SI. The other information (e.g. UE-specific information) is included in configuration that can be requested by UE with RRC signalling. Option C1 applies both in LTE and NR systems.

C2) Part of satellite assistance information (e.g. cell-specific information like satellite ephemeris of the last serving satellite and the upcoming satellite) is broadcast in the minimum SI. Part of satellite assistance information (cell-specific information for prediction like the minimum elevation angle of the last serving satellite) is in other SI that can be requested by UE on demand. The other information (e.g. UE-specific information) is included in configuration that can be requested by UE with RRC signalling. Option C2 only applies in NR systems.

If the prediction is to be made at network side, the following options could be possible.

C3) Network's prediction of the start and end time of coverage interruption for a specific UE is included in configuration that can be requested by UE with RRC signalling. This applies both in LTE and NR systems. In option C3, UE may need to report its location information to help network in prediction.

Figure 1D:
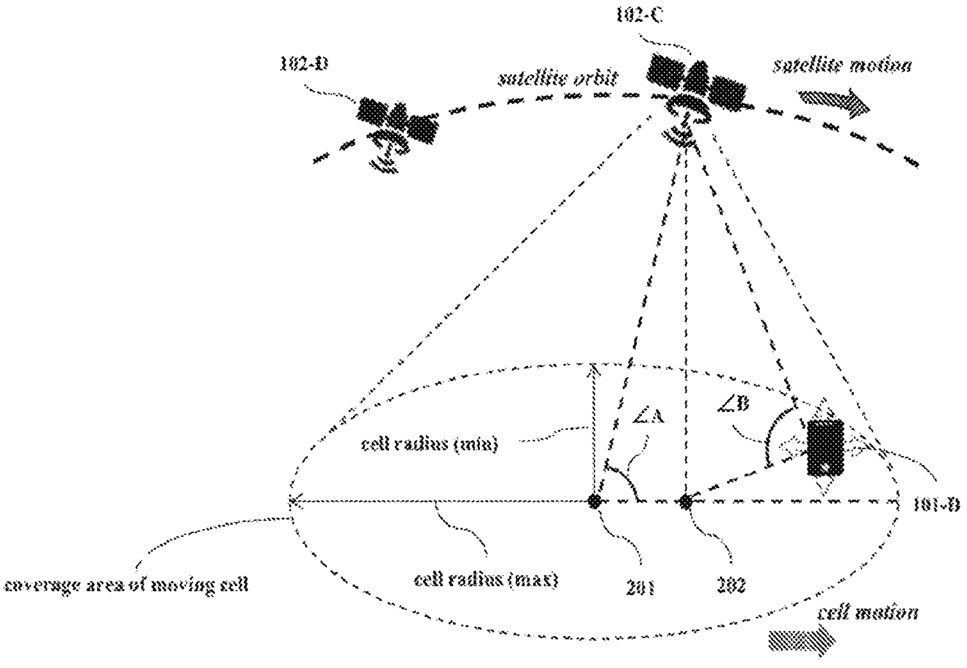

FIG. 1D illustrates a moving NTN cell scenario, and a high-mobility UE 101-D is within the moving cell.

In FIGS. 1D, there are two access nodes, access node 102-C and access node 102-D, which may be two satellites, one UE, UE 101-D. UE 101-D is a high mobility UE, which is assumed to be in anywhere within the cell coverage area before and after the coverage interruption. Each of satellite 102-C and satellite 102-D manages a variable cell on Earth, and the cell moves along with the satellite. UE 101-D needs at least one set of the following information to predict the start time of coverage interruption:

1. Satellite ephemeris of the last serving satellite, and the elevation angle from the last serving satellite to UE (and possibly its changing rate), and the minimum elevation angle from the last serving satellite to UE. UE needs to predict whether it is in the last serving cell based on satellite ephemeris, elevation angle and UE movement. The start time of coverage interruption could be calculated as the time when the elevation angle from the last serving satellite to UE becomes smaller than the minimum elevation angle.
2. Satellite ephemeris of the last serving satellite, and the last serving cell's coverage area information. UE needs to predict whether it is in the last serving cell based on satellite ephemeris, coverage area information and UE movement. The start time of coverage interruption could be calculated as the time when UE leaves the coverage area.
3. Network's prediction of the start time of coverage interruption. Network may be able to predict UE-specific start time of coverage interruption with UE's location and movement information.

UE needs at least one set of the following information to predict the end time of coverage interruption:

1. Satellite ephemeris of the upcoming satellite, and the upcoming cell's coverage area information. UE needs to predict whether it will be in the upcoming cell based on satellite ephemeris and coverage area information. The end time of coverage interruption could be calculated as the time when UE enters the coverage area.
2. Network's prediction of the end time of coverage interruption. Network may be able to predict UE-specific end time of coverage interruption with UE's location and movement information.

If the prediction is to be made at UE side, the network needs to provide necessary satellite assistance information (ephemeris only is not sufficient) to the UE. In the scenario of FIG. 1D, some of satellite assistance information mentioned above are UE-specific (similar to the scenario of FIG. 1C)), and therefore it is not possible to include all of them in SI broadcast. The following options could be possible.

D1) Part of satellite assistance information (e.g. cell-specific information like satellite ephemeris and the minimum elevation angle of the last serving satellite) is broadcast in SI. The other information (e.g. UE-specific information) is included in configuration that can be requested by UE with RRC signalling. This applies both in LTE and NR systems.

D2) Part of satellite assistance information (e.g. cell-specific information like satellite ephemeris of the last serving satellite and the upcoming satellite) is broadcast in the minimum SI. Part of satellite assistance information (cell-specific information for prediction like the minimum elevation angle of the last serving satellite) is in other SI that can be requested by UE on demand. The other information (e.g. UE-specific information) is included in configuration that can be requested by UE with RRC signalling. This only applies in NR systems.

If the prediction is to be made at network side, the following options could be possible.

D3) Network's prediction of the start and end time of coverage interruption for a specific UE is included in configuration that can be requested by UE with RRC signalling. This applies both in LTE and NR systems. In this option UE may need to report its location and movement information to help network in prediction.

Based on the above analysis, the prediction on the time duration (i.e. start and end time) of coverage interruption can be made at UE or network side. When the prediction is made at UE side, the options of satellite assistance information provisioning can be categorized as follows:

1) Broadcast all the non UE-specific satellite assistance information in SI. (please refer to the above option A1 and B1)

This is the simplest implementing option of satellite assistance information provisioning, which also requires the largest SI broadcast budget. In this option UE has to receive the full SI regardless whether some of the information has been provisioned for other purpose, e.g. satellite ephemeris, end time or cell center for timing advance pre-compensation or mobility. Moreover, the UE has to receive the full SI again if re-acquiring any the satellite assistance information is needed (e.g. due to value change or periodic updating).

This option is suitable when there is no UE-specific assistance information, and thus it can at least work for quasi-fixed cell scenario A) and B), and may work for moving cell scenario with strict assumption of unified UE capability. However, some 3GPP agreements could be against this option, for example, broadcast of start serving time of neighboring satellite is not supported in NR NTN, which renders broadcasting all the non UE-specific satellite assistance information in SI impossible.

2) [NR system only] Broadcast part of the non UE-specific satellite assistance information in the minimum SI, and the other non UE-specific part is included in other SI (please refer to the above option A2 and B2)

This option leverages the minimum SI concept in NR systems to reduce the SI broadcast budget. If some of the information (e.g. ephemeris) has been broadcasted, UE only needs to request for the other SI that includes the missing part (e.g. the minimum elevation angle). The UE may request again only for the other SI that includes the updated part instead of receiving the full SI.

Similar to Option 1), this option is suitable when there is no UE-specific assistance information, and thus it can at least work for quasi-fixed cell scenarios in FIG. 1A and FIG. 1B, and may work for moving cell scenario with strict assumption of unified UE capability.

3) Broadcast all the non UE-specific satellite assistance information in SI, and the UE-specific is included in RRC configuration (please refer to the above options A3, B3, C1, and D1)

This option enables provisioning UE-specific satellite assistance information. If the non UE-specific information (e.g. ephemeris) has been broadcasted, UE only needs to request via RRC for the configuration that includes the UE-specific part (e.g. elevation angle, coverage area information). The UE may request again via RRC only for the configuration that includes the updated part instead of receiving the full SI.

This option is suitable when there is UE-specific assistance information, and thus it is necessary for moving cell scenarios in FIG. 1C and FIG. 1D. For quasi-fixed cell scenarios in FIG. 1A and FIG. 1B, this option may not be that necessary.

4) [NR system only] Broadcast part of the non UE-specific satellite assistance information in SI, and the other non UE-specific part is included in other SI, and the other part is included in RRC configuration (please refer to the above options C2 and D2)

This option combines option 2) and option 3) and is necessary for moving cell scenarios in FIG. 1C and FIG. 1D.

In light of the above, to predict the time duration of coverage interruption at UE in NTN discontinuous coverage, broadcasting all satellite assistance information is inefficient due to the large SI budget in provisioning and updating, and it may not work at least for the moving cell scenario wherein some satellite assistance information is UE-specific.

In the present disclosure, a request-response procedure (via on-demand SI mechanism or dedicated signalling) is proposed for satellite assistance information provisioning.

When the prediction is made at network side, the options of satellite assistance information provisioning can be categorized as follows:

1) Broadcast in SI the network's prediction on the time duration (i.e. start and end time) of coverage interruption for all UEs in a cell: (please refer to the above options A4 and B4)

This is the simplest implementing option of provisioning network's prediction, which also requires the largest SI broadcast budget. In this option UE has to receive the full SI regardless whether it will encounter coverage interruption or not. Moreover, the UE has to receive the full SI again if re-acquiring network's prediction is needed (e.g. due to value change or periodic updating).

This option is suitable when the network's prediction is not UE-specific, and thus it can work for quasi-fixed cell scenario in FIG. 1A and FIG. 1B, but cannot work for moving cell scenario in FIG. 1C and FIG. 1D.

2) The network's prediction on the time duration (i.e. start and end time) of coverage interruption for all UEs in a cell is included in other SI (please refer to the above options A5 and B5).

This option leverages the minimum SI concept in NR systems to reduce the SI broadcast budget. UE only needs to request for the other SI that includes the network's prediction instead of receiving the full SI.

Similar to Option 1), this option is suitable when the network's prediction is not UE-specific, and thus it can work for quasi-fixed cell scenario in FIG. 1A and FIG. 1B, but cannot work for moving cell scenario in FIG. 1C and FIG. 1D.

3) The network's prediction on the time duration (i.e. start and end time) of coverage interruption for a specific UE is included in RRC configuration: (please refer to the above options A6, B6, C3, and D3)

This option enables provisioning UE-specific network's prediction. UE only needs to request via RRC for the configuration that includes the UE-specific network's prediction instead of receiving the full SI. In the request UE may also provide its location or movement information that may help network in prediction.

This option is suitable when the network's prediction is UE-specific, and thus it is necessary for moving cell scenarios in FIG. 1C and FIG. 1D. For quasi-fixed cell scenarios in FIG. 1A and FIG. 1B, this option may not be that necessary.

In view of the above, to predict the time duration of coverage interruption at network in NTN discontinuous coverage, provisioning network's prediction in SI can work only when the prediction is not UE-specific. A request-response procedure (via dedicated signalling) is needed at least for the moving cell scenario wherein network's prediction is UE-specific and UE's assistance may be necessary.

To solve the above mentioned issues, an assistance information exchange method is proposed in this disclosure.

The present disclosure uses the satellite as an example for the access node, to describe the solutions for determining network coverage interruption prediction with assistance information exchanged. It should be noted that the solutions of the present disclosure also apply to other access nodes with a variable coverage, or with a variable cell.

Figure 2:
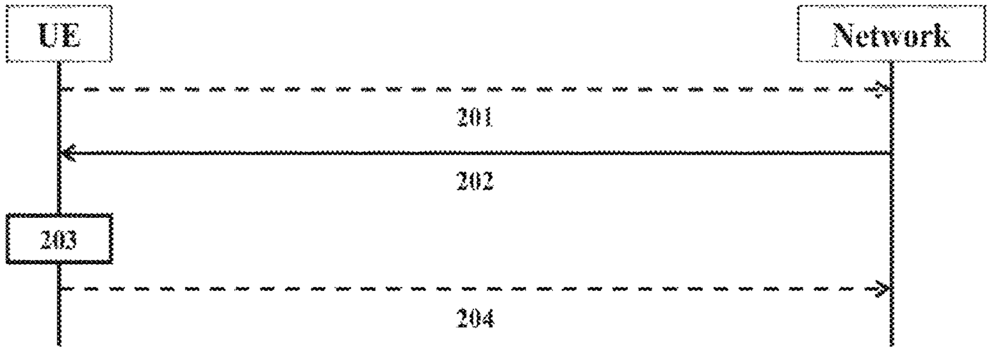
FIG. 2 illustrates an exemplary flow chart for determining network coverage interruption prediction according to some embodiments of the present disclosure.

FIG. 2 illustrates an exemplary flow chart for determining network coverage interruption prediction according to some embodiments of the present disclosure.

In operation 201, UE may transmit a message to the network, the message includes a request for access node assistance information to predict the coverage interruption at UE. In some embodiments, the UE may transmit the message when an event occurs, which triggers the UE to transmit the message. The event may include at least one of the following:

1. Upon receiving of an explicit indication from network that indicates UE to perform coverage interruption prediction.
2. Upon receiving of an explicit indication from network that indicates its coverage discontinuity or coverage edge.
3. Upon receiving of one or more parameters are included in the access node assistance information, which may implicitly indicate UE to perform coverage interruption prediction, or implicitly indicate the coverage discontinuity or coverage edge of the network. The assistance information may include at least one of the following:
   a) Ephemeris of one or more access nodes;
   b) elevation angle from access node to a reference location, or from access node to the UE;
   c) stop serving time of a serving access node;
   d) start serving time of an upcoming access node;
   e) coverage area information of a serving access node or an upcoming access node.
4. Random access initiation. The message may be transmitted in Msg3 of the 4-step RACH procedure, or in the MsgA payload of the 2-step RACH procedure. The message may be transmitted in other messages, or as a new message.
5. Random access completion. The message may be transmitted in Msg5 of the 4-step RACH procedure. The message may be transmitted in other messages, or as a new message.
6. RRC resume or RRC reestablishment completion.
7. At least one indicator is smaller than a configured or pre-determined threshold, the indicator may include at least one of the following:
   a) RSRP of a serving cell and/or one or more neighboring cells;
   b) RSRQ of a serving cell and/or one or more neighboring cells;
   c) the elevation angle from an access node to the UE;
   d) the elevation angle from an access node to a reference location;
   e) the remaining service time of an access node; or
   f) the distance from the UE to a reference location, etc.
8. Variation of at least one indicator is higher than a configured or pre-determined threshold, the indicators may include at least one of the following:
   a) RSRP of a serving cell and/or one or more neighboring cells;
   b) RSRQ of a serving cell and/or one or more neighboring cells;
   c) the elevation angle from an access node to the UE;
   d) the elevation angle from an access node to a reference location;
   e) the remaining service time of an access node; or
   f) the distance from the UE to a reference location, etc.
9. UE location approaches a configured or pre-determined area.

In some other scenarios, the UE may be triggered to transmit the message based on an expiration of a validity timer for the access node assistance information, for example, the validity timer may include at least one of the following:

1. Expiration of at least one validity timer for at least one kind of access node assistance information;
2. Expiration of a validity timer for the latest coverage interruption prediction at UE;
3. Expiration of a validity timer for the latest coverage interruption prediction received from network;
4. Expiration of a validity timer for the latest UE report of coverage interruption prediction to the network; or
5. Expiration of a validity timer for the latest UE report of adjustment to coverage interruption prediction received from network.

Or, the UE may be triggered to transmit the message based on the periodical request or prediction configured.

The request for access node assistance information may include at least one of the following:

1. 1-bit indication to indicate a request for the full access node assistance information.
2. A multi-bit indication to indicate a request for at least one kind of access node assistance information. For example, a two-bit indication may be used, when the value of the two-bit indication is "00", it means the UE request for ephemeris information, "01" for elevation angle, "10" for stop/start serving time and "11" for cell edge information.
3. A cell identity to indicate a request for access node assistance information of a dedicated cell, e.g. the serving cell or a neighboring cell. The UE may determine which cell is the next neighboring cell by network indication or existing ephemeris.
4. A access node identity to indicate a request for access node assistance information of a dedicated access node, e.g. the serving access node or a neighboring access node. The UE may determine which access node is the next neighboring access node by network indication or existing ephemeris.

The UE request for access node assistance information may be transmitted by:

1. A dedicated signalling message including the request for access node assistance information or for UE-specific access node assistance information, which could be an RRC message to the BS or a NAS message to a core network entity.
2. A dedicated RRC signalling message including the request for a SIB that includes cell-specific access node assistance information.
3. A media access control element (MAC CE) including the request for access node assistance information or for UE-specific access node assistance information.
4. A container message via Early Data Transmission (EDT), re-configured Uplink Grant (PUR) or Small Data Transmission (SDT) carrying the request for access node assistance information or for UE-specific access node assistance information.

Correspondingly, at network side, the network receives the message from the UE. In should be noted that operation 201 may not be necessary, in some scenarios, the UE may not transmit the message for access node assistance information.

In operation 202, the UE receives the access node assistance information from network to predict the coverage interruption at UE. The content of the access node assistance information may include at least one of cell-specific access node assistance information, UE-specific access node assistance information, and additional indication for the access node assistance information.

The cell-specific access node assistance information include at least one of:

1. Ephemeris of an access node, e.g. format 1 with orbital parameters or format 2 with coordinates.
2. End (stop serving) time of an access node e.g. in an absolute UTC format or a relative time length format.
3. Start (start serving) time of an access node e.g. in an absolute UTC format or a relative time length format.
4. The elevation angle from an access node to its cell center.
5. Common cell edge defined by cell center and radius, or cell nadir and radius, or the minimum RSRP/RSRQ, or the minimum propagation delay, or the minimum downlink serving elevation angle.

The UE-specific access node assistance information include at least one of:

1. The elevation angle from an access node to the UE, which could be obtained by network according to the beam direction that serves the UE
2. Ephemeris of the possible serving access node to the UE upon coverage interruption start (according to UE position and movement), e.g. format 1 with orbital parameters or format 2 with coordinates.
3. Ephemeris of a possible upcoming access node to the UE upon coverage interruption start (according to UE position and movement), e.g. format 1 with orbital parameters or format 2 with coordinates.
4. End (stop serving) time of the possible serving access node to the UE (according to UE position and movement) e.g. in an absolute UTC (Universal Time Coordinated) format or a relative time length format.
5. Start (start serving) time of a possible upcoming access node to the UE (according to UE position and movement) e.g. in an absolute UTC format or a relative time length format.
6. UE-specific cell edge defined by UE-specific minimum RSRP/RSRQ (according to UE power class and/or UE capability of uplink coverage enhancement), or UE-specific minimum propagation delay (according to UE power class and/or UE capability of uplink coverage enhancement), or UE-specific minimum uplink elevation angle (according to UE power class, UE antenna type and/or UE capability of uplink coverage enhancement).

Additional indication for the access node assistance information include at least one of:

1. An indication to indicate all UEs in the cell to report their prediction.
2. An indication to indicate a UE to report its prediction.

The UE may receive the access node assistance information from network in a similar fashion as the way the UE transmits the request for access node assistance information, that is, the access node assistance information may be received by:

1. A dedicated signalling message including the request for access node assistance information or for UE-specific access node assistance information, which could be an RRC message to the BS or a NAS message to a core network entity;
2. A dedicated RRC signalling message including the request for a SIB that includes cell-specific access node assistance information;
3. A MAC CE including the request for access node assistance information or for UE-specific access node assistance information; or
4. A container message via EDT, PUR or SDT carrying the request for access node assistance information or for UE-specific access node assistance information.

In operation 203, the UE predicts the coverage interruption based on access node assistance information. The UE's prediction of the coverage interruption could include at least one of the following:

1. The coverage interruption start time;
2. The serving cell identity at coverage interruption start time;
3. The serving access node identity at coverage interruption start time;
4. The coverage interruption end time;
5. The upcoming cell identity at coverage interruption end time; or
6. The upcoming access node identity at coverage interruption end time.

The coverage interruption prediction varies according to different cell scenarios, for quasi-fixed cell, the coverage interruption prediction is determined as follows:

1. Consider the cell-specific stop serving time of the serving access node as the coverage interruption start time.
2. Consider the UE-specific stop serving time of the possible serving access node as the coverage interruption start time.
3. Calculate the coverage interruption start time by cell-specific serving access node ephemeris and cell edge, which may be:
   - the time when the distance between UE and cell center/nadir becomes larger than the radius. For example, in FIG. 1A, the time when the distance between UE 101-A and cell center 201 or nadir 202 becomes larger than the cell radius (min) (or cell radius (max));
   - the time when UE's RSRP/RSRQ becomes smaller than the minimum RSRP/RSRQ;
   - the time when the propagation delay between UE and access node becomes larger than the minimum propagation delay;
   - the time when the elevation angle from the serving access node to its cell center becomes smaller than the minimum downlink serving elevation angle. For example, in FIG. 1A, the time when the angle "ZA" is smaller than the minimum downlink serving elevation angle; or
   - the time when the elevation angle from the serving access node to the UE becomes smaller than the minimum downlink serving elevation angle. For example, in FIG. 1A, the time when the angle "B" is smaller than the minimum downlink serving elevation angle.
4. Calculate the coverage interruption start time by UE-specific possible serving access node ephemeris and UE-specific cell edge, which could be:

the time when the distance between UE and cell center/nadir becomes larger than the radius. For example, in FIG. 1A, the time when the distance between UE 101-A and cell center 201 or nadir 202 becomes larger than the cell radius (min) (or cell radius (max));

the time when UE's RSRP/RSRQ becomes smaller than the minimum RSRP/RSRQ; or the time when the propagation delay between UE and access node becomes larger than the minimum propagation delay.

5. Consider the cell-specific start serving time of a neighboring access node as the coverage interruption end time.
6. Consider the UE-specific stop serving time of the possible upcoming access node as the coverage interruption end time.
7. Calculate the coverage interruption end time by cell-specific serving access node ephemeris and cell edge, which may be:

the time when the distance between UE and cell center/nadir becomes smaller than the radius. For example, in FIG. 1A, the time when the distance between UE 101-A and cell center 201 or nadir 202 becomes smaller than the cell radius (min) (or cell radius (max));

the time when UE's RSRP/RSRQ becomes larger than the minimum RSRP/RSRQ;

the time when the propagation delay between UE and access node becomes smaller than the minimum propagation delay;

the time when the elevation angle from the serving access node to its cell center becomes larger than the minimum downlink serving elevation angle. For example, in FIG. 1A, the time when the angle "ZA" is larger than the minimum downlink serving elevation angle; or the time when the elevation angle from the serving access node to the UE becomes larger than the minimum downlink serving elevation angle.

For example, in FIG. 1A, the time when the angle "ZB" is larger than the minimum downlink serving elevation angle.

8. Calculate the coverage interruption end time by UE-specific possible serving access node ephemeris and UE-specific cell edge, which could be:

the time when the distance between UE and cell center/nadir becomes smaller than the radius;

the time when UE's RSRP/RSRQ becomes larger than the minimum RSRP/RSRQ; or the time when the propagation delay between UE and access node becomes smaller than the minimum propagation delay.

For moving cell, the coverage interruption prediction is determined as follows:

1. Calculate the coverage interruption start time by cell-specific serving access node ephemeris and cell edge, which could be:

the time when the distance between UE and cell center/nadir becomes larger than the radius. For example, in FIG. 1C, the time when the distance between UE 101-A and cell center 201 or nadir 202 becomes larger than the cell radius (min) (or cell radius (max));

the time when UE's RSRP/RSRQ becomes smaller than the minimum RSRP/RSRQ;

the time when the propagation delay between UE and access node becomes larger than the minimum propagation delay; or the time when the elevation angle from the serving access node to UE becomes smaller than the minimum downlink serving elevation angle of the access node.

2. Calculate the coverage interruption start time by UE-specific possible serving access node ephemeris and UE-specific cell edge, which could be:

the time when the distance between UE and cell center/nadir becomes larger than the radius;

the time when UE's RSRP/RSRQ becomes smaller than the minimum RSRP/RSRQ;

the time when the propagation delay between UE and access node becomes larger than the minimum propagation delay; or the time when the elevation angle from the serving access node to UE becomes smaller than the minimum uplink elevation angle of UE. For example, in FIG. 1C, the time when the angle "/B" is smaller than the minimum downlink serving elevation angle.

3. Calculate the coverage interruption end time by cell-specific serving access node ephemeris and cell edge, which could be:

the time when the distance between UE and cell center/nadir becomes smaller than the radius;

the time when UE's RSRP/RSRQ becomes larger than the minimum RSRP/RSRQ;

the time when the propagation delay between UE and access node becomes smaller than the minimum propagation delay; or the time when the elevation angle from the serving access node to its cell center becomes larger than the minimum downlink serving elevation angle of the access node. For example, in FIG. 1C, the time when the angle "∠B" is larger than the minimum downlink serving elevation angle.

4. Calculate the coverage interruption end time by UE-specific possible serving access node ephemeris and UE-specific cell edge, which could be:

the time when the distance between UE and cell center/nadir becomes smaller than the radius;

the time when UE's RSRP/RSRQ becomes larger than the minimum RSRP/RSRQ;

the time when the propagation delay between UE and access node becomes smaller than the minimum propagation delay; or the time when the elevation angle from the serving access node to UE becomes larger than the minimum uplink elevation angle of UE. For example, in FIG. 1C, the time when the angle "∠B" is larger than the minimum downlink serving elevation angle.

In operation 204, the UE reports its prediction of the coverage interruption to the network.

The report may include at least one of the following:

UE predicted coverage interruption start time;

The serving cell identity at coverage interruption start time;

The serving access node identity at coverage interruption start time;

UE predicted coverage interruption end time;

The upcoming cell identity at coverage interruption end time;

The upcoming access node identity at coverage interruption end time; or

Expected actions and/or configurations for the start/end of coverage interruption, e.g. RRC release/resume.

The UE may transmit the report in a similar was as transmitting the request for assistance information, which may be by at least one of the following:

1. A dedicated signalling message including the report for the coverage interruption prediction, which could be an RRC message to the BS or a NAS message to a core network entity;
2. A dedicated RRC signalling message including the report for the coverage interruption prediction;
3. A MAC CE including the report for the coverage interruption prediction; or
4. A container message via EDT, PUR or SDT carrying the report for the coverage interruption prediction.

The UE may be triggered to transmit the report by at least one of the following:

1. Upon receiving a network indication, which indicates the UE to transmit the coverage interruption prediction;
2. Expiration of a validity timer for the latest coverage interruption prediction at UE;
3. Expiration of a validity timer for the latest UE report of coverage interruption prediction to the network; or
4. Periodically report. That is, the UE transmit the coverage interruption prediction periodically.

Correspondingly, at network side, the access node receives the coverage interruption prediction predicted by the UE.

In some other embodiments, the coverage interruption prediction is performed by the network.

Figure 3:
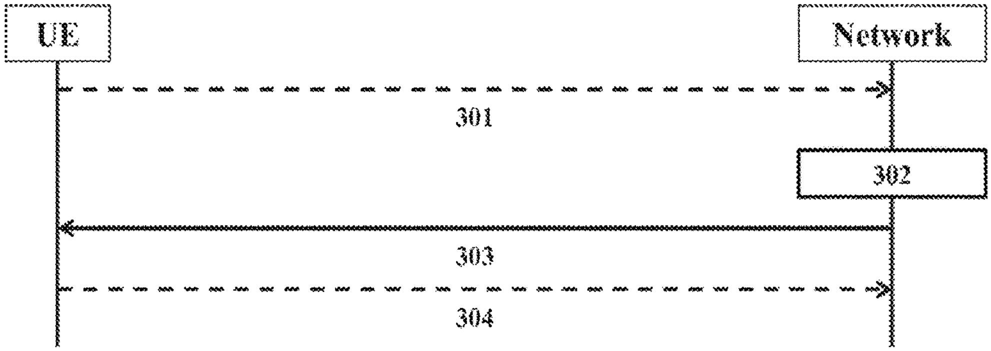
FIG. 3 illustrates an exemplary flow chart for determining network coverage interruption prediction according to some embodiments of the present disclosure.

FIG. 3 illustrates an exemplary flow chart for determining network coverage interruption prediction according to some embodiments of the present disclosure.

In operation 301, the UE transmits UE assistance information to network, such that the network may predict the coverage interruption based on the UE assistance information.

In some embodiments, the UE may transmit the UE assistance information when an event occurs, which triggers the UE to transmit the message. The event may include at least one of the following:

1. Upon receiving of an explicit indication from network that indicates UE to transmit UE assistance information;
2. Upon receiving of an explicit indication from network that indicates its coverage discontinuity or coverage edge;
3. Upon receiving of ephemeris from network, which may implicitly indicate UE to transmit UE assistance information, or implicitly indicate the coverage discontinuity or coverage edge of the network;
4. Random access initiation. The message may be transmitted in Msg3 of the 4-step RACH procedure, or in the MsgA payload of the 2-step RACH procedure. The message may be transmitted in other messages, or as a new message;
5. Random access completion. The message may be transmitted in Msg5 of the 4-step RACH procedure. The message may be transmitted in other messages, or as a new message;
6. RRC resume or RRC reestablishment completion;
7. At least one indicator is smaller than a configured or pre-determined threshold, the indicator may include at least one of the following:
    a) RSRP of a serving cell and/or one or more neighboring cells;
    b) RSRQ of a serving cell and/or one or more neighboring cells;
    c) The elevation angle from an access node to the UE;
    d) The elevation angle from an access node to a reference location;
    e) The remaining service time of an access node; or
    f) The distance from the UE to a reference location, etc.
8. Variation of at least one indicator is higher than a configured or pre-determined threshold, the indicators may include at least one of the following:
    g) RSRP of a serving cell and/or one or more neighboring cells;
    h) RSRQ of a serving cell and/or one or more neighboring cells;
    i) The elevation angle from an access node to the UE;
    j) The elevation angle from an access node to a reference location;
    k) The remaining service time of an access node; or
    l) The distance from the UE to a reference location, etc.; or
9. UE location approaches a configured or pre-determined area.

In some other scenarios, the UE may be triggered to transmit UE assistance information based on an expiration of a validity timer for the access node assistance information, for example, the validity timer may include at least one of the following:

1. Expiration of a validity timer for UE assistance information;
2. Expiration of a validity timer for access node ephemeris;
3. Expiration of a validity timer for the latest network's prediction;
4. Expiration of a validity timer for the latest UE's prediction;
5. Expiration of a validity timer for the latest UE report of adjustment to coverage interruption prediction received from network; or
6. Expiration of a validity timer for the latest UE report of coverage interruption prediction to the network.

Or, the UE may be triggered to transmit UE assistance information when periodical assistance is configured.

The UE assistance information may include at least one of the following:

1. UE's accurate location information, e.g. in GNSS coordinates;
2. UE's coarse location information, e.g. an area with ranges;
3. UE's accurate movement information, e.g. accurate velocity or predicted GNSS coordinates after a certain time period;
4. UE's coarse movement information, e.g. coarse velocity or predicted area with ranges after a certain time period;
5. 1-bit indication to request for network's prediction on coverage interruption;
6. A cell ID to request for network's prediction on coverage interruption of the serving cell or a neighboring cell; or
7. Any Combination of the above information.

The UE assistance information may be transmitted by at least one of the following:

1. A dedicated signalling message including the UE assistance information, which could be an RRC message to the BS or a NAS message to a core network entity;

2. A dedicated RRC signalling message including UE assistance information;
3. A MAC CE including the UE assistance information; or
4. A container message via EDT, PUR or SDT carrying the UE assistance information.

Correspondingly, at network side, the access node receives the UE assistance information. In should be noted that operation 301 may not be necessary, in some scenarios, the UE may not transmit the UE assistance information.

In operation 302, the access node determines the coverage interruption prediction based on the UE assistance information. Since the access node is aware of the full access node assistance information, the access node determines the coverage interruption prediction at least based on the UE assistance information and/or full access node assistance information, and in operation 303, the access node transmits the coverage interruption prediction to the UE.

The coverage interruption prediction from the network could include at least one of the following:

1. Prediction of cell-specific coverage interruption associated to a cell, which may at least include:
   - The coverage interruption start time;
   - The serving cell identity at coverage interruption start time;
   - The serving access node identity at coverage interruption start time;
   - The coverage interruption end time;
   - The upcoming cell identity at coverage interruption end time; or
   - The upcoming access node identity at coverage interruption end time.
2. Prediction of UE-specific coverage interruption associated to a UE, which may refer to UE's location and/or movement, and may at least include:
   - The coverage interruption start time;
   - The serving cell identity at coverage interruption start time;
   - The serving access node identity at coverage interruption start time;
   - The coverage interruption end time;
   - The upcoming cell identity at coverage interruption end time; or
   - The upcoming access node identity at coverage interruption end time.
3. Additional indication for the access node assistance information, which may at least include:
   - An indication to indicate all UEs in the cell to report their adjustment to the network's prediction; or
   - An indication to indicate a UE to report its adjustment to the network's prediction.

The UE may receive the network's prediction from network by at least one of the following e by at least one of the following:

1. A dedicated signalling message including the coverage interruption prediction, which could be an RRC message to the BS or a NAS message to a core network entity;
2. A dedicated RRC signalling message including the coverage interruption prediction;
3. A MAC CE including the coverage interruption prediction; or
4. A container message via EDT, PUR or SDT carrying the coverage interruption prediction.

In operation 304, the UE may report its adjustment to network's prediction to the network.

The report of adjustment to network's prediction could include at least one of the following:

1. Adjustment value for the coverage interruption start time;
2. Adjustment to the serving cell identity at coverage interruption start time;
3. Adjustment to the serving access node identity at coverage interruption start time;
4. Adjustment value for the coverage interruption end time;
5. Adjustment to the upcoming cell identity at coverage interruption end time; or
6. Adjustment to the upcoming access node identity at coverage interruption end time.

The UE may transmit the report of adjustment to network's prediction by at least one of the following:

1. A dedicated signalling message including the report of adjustment to network's prediction, which could be an RRC message to the BS or a NAS message to a core network entity;
2. A dedicated RRC signalling message including the report of adjustment to network's prediction;
3. A MAC CE including the report of adjustment to network's prediction; or
4. A container message via EDT, PUR or SDT carrying the report of adjustment to network's prediction.

The UE may be triggered to transmit the report by at least one of the following:

1. Upon receiving a network indication, which indicates the UE to transmit the report of adjustment to network's prediction;
2. Different serving/upcoming cell/access node is predicted;
3. Difference between UE's prediction and network's prediction is beyond a configured or pre-determined threshold;
4. Expiration of a validity timer for the latest coverage interruption prediction received from network;
5. Expiration of a validity timer for the latest UE report of adjustment to coverage interruption prediction received from network; or
6. Periodical report.

It should be noted that operation 304 is optional, that is, the UE may not report its adjustment to the network's prediction to the network.

In the above described solutions, some parameters such as satellite ephemeris, may only exist with the satellite as the access node, while other access nodes with a variable coverage may not have this parameter. In this case, the solution may be performed without the parameters that only exist when the access node is the satellite. For example, suppose an access node with a variable cell, which is a hot air bloom, and it is configured with a specific moving pattern, in this case, the access node (the hot air bloom) may exchange the moving pattern with the UE, and the UE still can predict the network coverage interruption with the solutions described in FIGS. 2 and/or FIG. 3. For another instance, suppose an access node which is a moving vehicle, which moves with a regular pattern. In this case, the access node (the moving vehicle) may exchange the moving pattern with the UE, and the UE still can predict the network coverage interruption with the solutions described in FIGS. 2 and/or FIG. 3.

Figure 4:
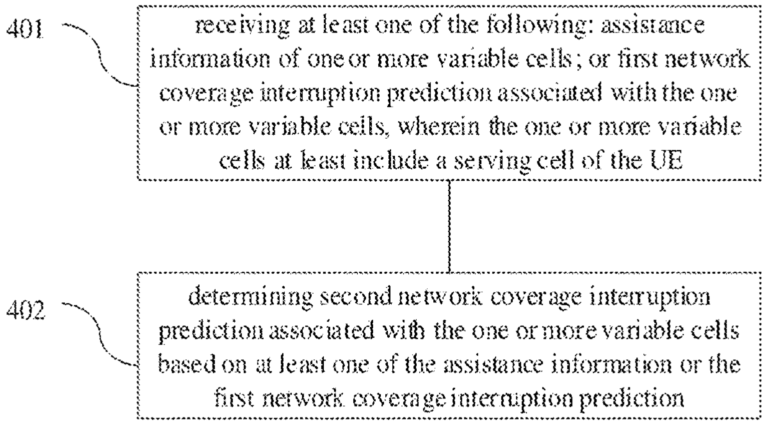
FIG. 4 illustrates a method performed by a UE for determining network coverage interruption prediction according to some embodiments of the present disclosure.

FIG. 4 illustrates a method performed by a UE for determining network coverage interruption prediction according to some embodiments of the present disclosure.

In operation 401, the UE receives at least one of the following: assistance information of one or more variable cells; or first network coverage interruption prediction associated with the one or more variable cells, wherein the one or more variable cells at least include a serving cell of the UE; and in operation 402, the UE determines second network coverage interruption prediction associated with the one or more variable cells based on at least one of the assistance information or the first network coverage interruption prediction.

In some embodiments, the transceiver is further configured to transmit a request including at least one of: a first indicator requesting the assistance information of one or more variable cells; or a second indicator requesting the first network coverage interruption prediction associated with the one or more variable cells. For example, in step 201, the UE transmits a request for the assistance information of one or more variable cells. In step 301, the UE transmits a request for the first network coverage interruption prediction associated with the one or more variable cells.

In some embodiments, the transceiver is triggered to transmit the request by an event, a timer, or periodically.

For example, the event may include at least one of the following: the UE receives an explicit indication from network that indicates UE to perform coverage interruption prediction, or receives an explicit indication from network that indicates its coverage discontinuity or coverage edge, etc.

In some embodiments, the first indicator includes at least one of the following: an indication indicating a request for full assistance information; an indication indicating a part of the assistance information; one or more cell identities associated with the assistance information; or one or more access node identities associated with the assistance information.

In some embodiments, the second indicator includes at least one of the following: location information of the UE; movement information of the UE; an indication requesting for the first network coverage interruption; one or more cell identities associated with the first network coverage interruption; or one or more moving access node identities associated with the first network coverage interruption.

In some embodiments, the request is transmitted in a dedicated signaling, a dedicated RRC signaling, a MAC CE, or a container message.

In some embodiments, the assistance information includes at least one of the following: cell-specific assistance information; UE-specific assistance information; or an additional indication requesting report of the second network coverage interruption prediction.

In some embodiments, the assistance information is received in a dedicated signaling, a dedicated RRC signaling, a MAC CE, or a container message.

In some embodiments, the first network coverage interruption prediction includes at least one of: network coverage interruption prediction associated with one or more cells; network coverage interruption prediction associated with the UE; or an indication for reporting the second network coverage interruption prediction.

In some embodiments, the second network coverage interruption prediction includes at least one of the following: a start time of network coverage interruption; a serving cell identity at the start time; a serving access node identity at the start time; an end time of network coverage interruption; an upcoming cell identity at the end time; or an upcoming access node identity at the end time.

In some embodiments, determining the second network coverage interruption prediction includes: determining a start time of network coverage interruption based on at least one of: a cell-specific stop serving time of the serving access node; a UE-specific stop serving time of a possible serving access node; an ephemeris of a cell-specific serving access node and a cell edge of a cell managed by the cell-specific serving access node; or an ephemeris of a UE-specific possible serving access node and a UE-specific cell edge a cell managed by the UE-specific possible serving access node; and/or determining an end time of network coverage interruption based on at least one of: a cell-specific start serving time of an upcoming access node; a UE-specific start serving time of the upcoming access node; an ephemeris of a cell-specific serving access node and a cell edge of a cell managed by the cell-specific serving access node; or an ephemeris of a UE-specific possible serving access node and a UE-specific cell edge of a cell managed by the UE-specific possible serving access node.

In some embodiments, the transceiver is further configured to: report the second network coverage interruption prediction to the serving access node.

In some embodiments, the second prediction is transmitted in a dedicated signalling message, a MAC CE, or a container message.

In some embodiments, the transceiver is further configured to: report the second network coverage interruption prediction to the serving access node in at least one of the following cases: upon receiving an indication for reporting the second network coverage interruption prediction; upon expiration of a validity timer; or in a periodically way.

Figure 5:
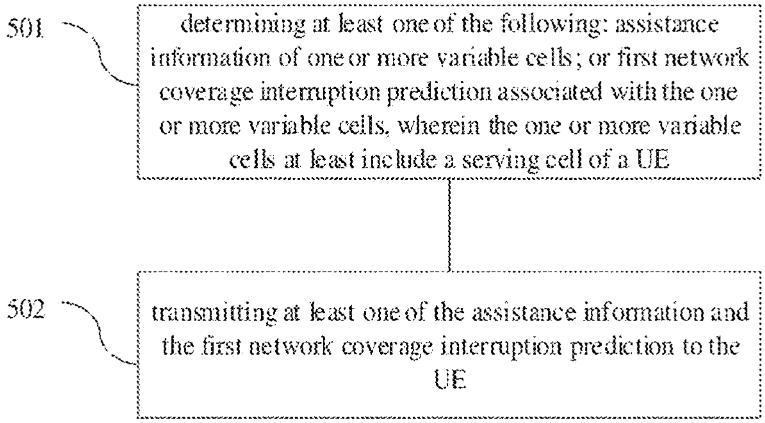
FIG. 5 illustrates a method performed by an access node for determining network coverage interruption prediction according to some embodiments of the present disclosure.

FIG. 5 illustrates a method performed by an access node for determining network coverage interruption prediction according to some embodiments of the present disclosure.

In operation 501, the access node determines at least one of the following: assistance information of one or more variable cells; or first network coverage interruption prediction associated with the one or more variable cells, wherein the one or more variable cells at least include a serving cell of a UE; and in operation 502, the access node transmits at least one of the assistance information and the first network coverage interruption prediction to the UE.

Figure 6:
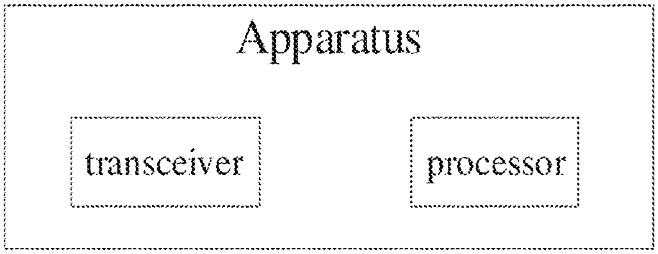
FIG. 6 illustrates a block diagram of an apparatus according to some embodiments of the present disclosure.

FIG. 6 illustrates a block diagram of an apparatus according to some embodiments of the present disclosure.

The apparatus may be or include at least a part of a BS, a gNB, an eNB, an access node, a satellite, a UE, or other device with similar functionality.

The apparatus may include a processor and a transceiver coupled with the processor. In some embodiments, the transceiver may include a transmitter and a receiver. The processor is configured to perform any of the methods described in the present disclosure, for example, the method described with respect to FIGS. 4 and 5. For example, when the apparatus is implemented as a network node, the processor may determine at least one of the following: assistance information of one or more variable cells; or first network coverage interruption prediction associated with the one or more variable cells, wherein the one or more variable cells at least include a serving cell of a UE; and the transceiver may transmit at least one of the assistance information and the first network coverage interruption prediction to the UE.

When the apparatus is implemented as a UE, the receiver may receive at least one of the following: assistance information of one or more variable cells; or first network coverage interruption prediction associated with the one or more variable cells, wherein the one or more variable cells at least include a serving cell of the UE; and the processor may determine second network coverage interruption prediction associated with the one or more variable cells based on at least one of the assistance information or the first network coverage interruption prediction.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each FIG. are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A user equipment (UE) for wireless communication, comprising:
- at least one memory; and
- at least one processor coupled with the at least one memory and configured to cause the UE to:
  - receive at least one of assistance information of one or more variable cells, or first network coverage interruption prediction associated with the one or more variable cells, wherein the one or more variable cells include at least a serving cell of the UE; and
  - determine second network coverage interruption prediction associated with the one or more variable cells based on at least one of the assistance information or the first network coverage interruption prediction.

2. The UE of claim 1, wherein the at least one processor is further configured to cause the UE to transmit a request including at least one of:
- a first indicator requesting the assistance information of one or more variable cells; or
- a second indicator requesting the first network coverage interruption prediction associated with the one or more variable cells.

3. The UE of claim 2, wherein the first indicator includes at least one of:
- an indication indicating a request for full assistance information;
- an indication indicating a part of the assistance information;
- one or more cell identities associated with the assistance information; or
- one or more access node identities associated with the assistance information.

4. The UE of claim 2, wherein the second indicator includes at least one of:
- location information of the UE;
- movement information of the UE;
- an indication requesting the first network coverage interruption prediction;
- one or more cell identities associated with the first network coverage interruption prediction; or
- one or more moving access node identities associated with the first network coverage interruption prediction.

5. The UE of claim 1, wherein the assistance information includes at least one of:
- cell-specific assistance information;
- UE-specific assistance information; or
- an additional indication requesting report of the second network coverage interruption prediction.

6. The UE of claim 1, wherein the second network coverage interruption prediction includes at least one of:
- a start time of network coverage interruption;
- a serving cell identity at the start time;
- a serving access node identity at the start time;
- an end time of network coverage interruption;
- an upcoming cell identity at the end time; or
- an upcoming access node identity at the end time.

7. The UE of claim 1, wherein to determine the second network coverage interruption prediction includes at least one of:
- determine a start time of network coverage interruption based on at least one of:
  - a cell-specific stop serving time of a serving access node;
  - a UE-specific stop serving time of a possible serving access node;
  - an ephemeris of a cell-specific serving access node and a cell edge of a cell managed by the cell-specific serving access node; or
  - an ephemeris of a UE-specific possible serving access node and a UE-specific cell edge a cell managed by the UE-specific possible serving access node; or
- determine an end time of network coverage interruption based on at least one of:
  - a cell-specific start serving time of an upcoming access node;
  - a UE-specific start serving time of the upcoming access node;
  - an ephemeris of a cell-specific serving access node and a cell edge of a cell managed by the cell-specific serving access node; or
  - an ephemeris of a UE-specific possible serving access node and a UE-specific cell edge of a cell managed by the UE-specific possible serving access node.

8. The UE of claim 1, wherein the at least one processor is further configured to cause the UE to:
- report the second network coverage interruption prediction to a serving access node of the serving cell.

9. The UE of claim 1, wherein the at least one processor is further configured to cause the UE to:

report the second network coverage interruption prediction to a serving access node at least one of:
upon receiving an indication for reporting the second network coverage interruption prediction;
upon an expiration of a validity timer; or
periodically.

10. An access node for wireless communication, comprising:
at least one memory; and
at least one processor coupled with the at least one memory and configured to cause the access node to:
determine at least one of:
assistance information of one or more variable cells, or
first network coverage interruption prediction associated with the one or more variable cells, wherein the one or more variable cells include at least a serving cell of a user equipment (UE); and
transmit at least one of the assistance information and the first network coverage interruption prediction to the UE.

11. The access node of claim 10, wherein the at least one processor is further configured to cause the access node to receive a request that includes at least one of:
a first indicator requesting the assistance information of one or more variable cells; or
a second indicator requesting the first network coverage interruption prediction associated with the one or more variable cells.

12. The access node of claim 11, wherein the first indicator includes at least one of:
an indication indicating a request for full assistance information;
an indication indicating a part of the assistance information;
one or more cell identities associated with the assistance information; or
one or more access node identities associated with the assistance information.

13. The access node of claim 10, wherein the assistance information includes at least one of:
cell-specific assistance information;
UE-specific assistance information; or
an additional indication requesting report of a second network coverage interruption prediction to the UE or to multiple UEs.

14. A processor for wireless communication, comprising:
at least one controller coupled with at least one memory and configured to cause the processor to:
receive at least one of assistance information of one or more variable cells, or first network coverage interruption prediction associated with the one or more variable cells, wherein the one or more variable cells include at least a serving cell of a user equipment (UE) that includes the processor; and
determine second network coverage interruption prediction associated with the one or more variable cells based on at least one of the assistance information or the first network coverage interruption prediction.

15. The processor of claim 14, wherein the at least one controller is further configured to cause the processor to transmit a request including at least one of:
a first indicator requesting the assistance information of one or more variable cells; or
a second indicator requesting the first network coverage interruption prediction associated with the one or more variable cells.

16. The processor of claim 15, wherein the first indicator includes at least one of:
an indication indicating a request for full assistance information;
an indication indicating a part of the assistance information;
one or more cell identities associated with the assistance information; or
one or more access node identities associated with the assistance information.

17. The processor of claim 15, wherein the second indicator includes at least one of:
location information of the UE;
movement information of the UE;
an indication requesting the first network coverage interruption prediction;
one or more cell identities associated with the first network coverage interruption prediction; or
one or more moving access node identities associated with the first network coverage interruption prediction.

18. The processor of claim 14, wherein the assistance information includes at least one of:
cell-specific assistance information;
UE-specific assistance information; or
an additional indication requesting report of the second network coverage interruption prediction.

19. The processor of claim 14, wherein to determine the second network coverage interruption prediction includes at least one of:
determine a start time of network coverage interruption based on at least one of:
a cell-specific stop serving time of a serving access node;
a UE-specific stop serving time of a possible serving access node;
an ephemeris of a cell-specific serving access node and a cell edge of a cell managed by the cell-specific serving access node; or
an ephemeris of a UE-specific possible serving access node and a UE-specific cell edge a cell managed by the UE-specific possible serving access node; or
determine an end time of network coverage interruption based on at least one of:
a cell-specific start serving time of an upcoming access node;
a UE-specific start serving time of the upcoming access node;
an ephemeris of a cell-specific serving access node and a cell edge of a cell managed by the cell-specific serving access node; or
an ephemeris of a UE-specific possible serving access node and a UE-specific cell edge of a cell managed by the UE-specific possible serving access node.

20. A method performed by a user equipment (UE), the method comprising:
receiving at least one of assistance information of one or more variable cells, or first network coverage interruption prediction associated with the one or more variable cells, wherein the one or more variable cells include at least a serving cell of the UE; and
determining second network coverage interruption prediction associated with the one or more variable cells based on at least one of the assistance information or the first network coverage interruption prediction.

* * * * *